US012794070B2

(12) United States Patent
Woo et al.

(10) Patent No.: US 12,794,070 B2
(45) Date of Patent: Nov. 10, 2026

(54) HOUSING STACKING TYPE ENERGY STORAGE SYSTEM

(71) Applicant: HYOSUNG HEAVY INDUSTRIES CORPORATION, Seoul (KR)

(72) Inventors: Jung Sik Woo, Changwon-si (KR); Dae Hee Choi, Changwon-si (KR); Jung Hyun Lee, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 659 days.

(21) Appl. No.: 18/258,882

(22) PCT Filed: May 30, 2023

(86) PCT No.: PCT/KR2023/007363
§ 371 (c)(1),
(2) Date: Jun. 22, 2023

(87) PCT Pub. No.: WO2024/228418
PCT Pub. Date: Nov. 7, 2024

(65) Prior Publication Data

US 2024/0372203 A1 Nov. 7, 2024

(30) Foreign Application Priority Data

May 4, 2023 (KR) ........................ 10-2023-0058714

(51) Int. Cl.
*H01M 50/262* (2021.01)
*H01M 10/46* (2006.01)
(Continued)

(52) U.S. Cl.
CPC ......... *H01M 50/262* (2021.01); *H01M 10/46* (2013.01); *H01M 10/613* (2015.04); (Continued)

(58) Field of Classification Search
None
See application file for complete search history.

(56) References Cited

U.S. PATENT DOCUMENTS

2005/0242774 A1 11/2005 Marraffa
2023/0344063 A1* 10/2023 Kim .................... H01M 50/264

FOREIGN PATENT DOCUMENTS

KR 100854603 B1 8/2008
KR 20170082817 A 7/2017
(Continued)

*Primary Examiner* — Tracy M Dove
(74) *Attorney, Agent, or Firm* — NKL Law; Jae Youn Kim

(57) ABSTRACT

The present disclosure is a housing stacking energy storage system. In the present disclosure, a first housing 10 and a second housing 20 having a predetermined size are stacked, and a rack 30 is installed in a first inner space 11 of the first housing 10 and a second inner space 21 of the second housing 20 to mount a plurality of battery packs 32. The first inner space 11 and the second inner space 21 communicate with each other to form one space, and a control unit 46, a fire extinguishing system 47 and a spray system 48 are installed therein. According to the present disclosure, it is possible to firmly install the energy storage system having a relatively large capacity in a specific installation area.

19 Claims, 15 Drawing Sheets

(51) Int. Cl.

| | |
|---|---|
| ***H01M 10/613*** | (2014.01) |
| ***H01M 10/6567*** | (2014.01) |
| ***H01M 50/204*** | (2021.01) |
| ***H01M 50/24*** | (2021.01) |
| ***H01M 50/289*** | (2021.01) |
| ***H01M 50/383*** | (2021.01) |
| *H02J 7/00* | (2006.01) |

(52) U.S. Cl.
CPC ..... *H01M 10/6567* (2015.04); *H01M 50/204* (2021.01); *H01M 50/24* (2021.01); *H01M 50/289* (2021.01); *H01M 50/383* (2021.01); *H02J 7/865* (2026.01)

(56) References Cited

FOREIGN PATENT DOCUMENTS

| | | | | | |
|---|---|---|---|---|---|
| KR | 101918022 | B1 | * | 11/2018 | .......... H01M 10/627 |
| KR | 20180123535 | A | * | 11/2018 | ............ H01M 10/48 |
| KR | 20190014989 | A | * | 2/2019 | ........ H01M 8/04276 |
| KR | 1020200088553 | A | | 7/2020 | |
| KR | 20220043063 | A | | 4/2022 | |
| KR | 1020220135123 | A | | 10/2022 | |

* cited by examiner

HOUSING STACKING TYPE ENERGY STORAGE SYSTEM

TECHNICAL FIELD

The present disclosure relates to an energy storage system, and more particularly, to a housing stacking type energy storage system in which housings are stacked and inner spaces of the stacked housings are formed into a single space in communication with each other.

BACKGROUND ART

An energy storage system, abbreviated as ESS, stores electric energy in an internal battery pack so that the electric energy may be used when needed. Such an energy storage system is installed not only indoors but also outdoors and is widely used.

Energy storage system is generally made in various container sizes such as 20 ft and 40 ft, making it easy to move to an installation location. Prior arts 1 and 2 disclose container-type energy storage systems.

However, as in the prior arts, energy storage systems made of a certain standard container size cannot be simply stacked, so they are installed one by one in a single layer at the installation site. Therefore, when multiple energy storage systems are used, a large installation area is required to ensure a legally required distance between the storage systems.

In order to solve these problems, in some cases, two separate energy storage systems are stacked and used. However, in this case, the two energy storage systems are not directly stacked, but there is a certain space between the energy storage systems stacked up and down. If two energy storage systems are stacked directly, there is a problem in that an explosion or deflagration discharged from a deflagration outlet, usually installed on an upper plate of the lower energy storage system, is transmitted to the upper energy storage system and therefore cannot be actually used.

Therefore, in the prior art, when stacking two energy storage systems, a separate support structure is made for the installation of the energy storage systems, and the energy storage systems are placed on the upper part and lower part of the structure, respectively. In such a structure, the height of the energy storage system stacked on the second floor becomes relatively high from the ground, and there is a vulnerability to earthquake and wind load for the energy storage system on the second floor. In addition, the cost for manufacturing the structure is added.

As the prior art of such an energy storage system, there are Korean Patent Application Publication No. 10-2020-0088553 and Korean Patent Application Publication No. 10-2022-0135123.

DISCLOSURE

Technical Problem

An objective of the present disclosure is to provide an energy storage system with a large capacity while using a relatively small area.

An objective of the present disclosure is to separately manufacture an energy storage system into a first housing and a second housing, and stack the first housing and the second housing.

An objective of the present disclosure is to manufacture an energy storage system separately into a first housing and a second housing, and to install components by making the inside of the first housing and the second housing into a single space.

An objective of the present disclosure is to manufacture an energy storage system by stacking a first housing and a second housing having a size that may be transported using standardized means of transportation.

An objective of the present disclosure is to configure the exterior of an energy storage system by directly stacking housings having a size that may be transported using standardized means of transportation.

An objective of the present disclosure is to prevent sagging of an upper housing by using a lower housing in an energy storage system manufactured by stacking housings.

An objective of the present disclosure is to facilitate the flow of a fluid for heat dissipation in the inner space of an energy storage system manufactured by stacking housings.

An objective of the present disclosure is to allow abnormal pressure generated inside an energy storage system manufactured by stacking housings to be discharged to the outside without damaging the housing.

Technical Solution

According to the characteristics to achieve the above objectives, the present disclosure may provide an energy storage system having a high capacity compared to an area by stacking a first housing and a second housing having a predetermined size.

The housing stacking energy storage system of the present disclosure includes: a first housing having a first inner space therein; a second housing mounted and stacked on the first housing and having a second inner space therein; a plurality of battery packs mounted on racks installed in the first inner space and the second inner space; and a control unit controlling charging and discharging of the battery pack.

The first inner space and the second inner space communicate with each other, and a plurality of racks installed in the first inner space and the second inner space may be arranged in a row.

The first housing may include a first housing frame that forms its skeleton and a first door unit that allows access to the first inner space. The second housing may include a second housing frame that forms its skeleton and a second door unit that allows access to the second inner space.

An anti-sag bracket may be provided to connect a vertical member of the first housing frame and a vertical member of the second housing frame.

The anti-sag bracket may include a protector body with multiple fastening holes formed at both ends, a first spacer block provided on one surface of the protector body to be in close contact with the first housing frame, and a second spacer block provided on one surface of the protector body to be in close contact with the second housing frame.

A reinforcing piece protruding and extending from the opposite surface of the first and second spacer blocks in the longitudinal direction of the protector body may be further provided.

A first fastening part having a first fastening hole is provided at corners of the first housing, and a second fastening part having a second fastening hole is provided at corners of the second housing, such that the first housing and the second housing may be fastened each other.

Components constituting the control unit may be installed inside the first and second housings. Additionally, a fire extinguishing system and a spray system may be further provided inside the first housing and the second housing.

The spray system may be installed in the second inner space of the second housing.

The upper surface of the second housing may be further provided with a pressure discharge plate that is torn open by pressure and discharges the pressure to the outside when the pressure of the first inner space and the second inner space exceeds a predetermined level.

A heat exchange unit may be further provided to supply a fluid at a predetermined temperature to the first and second housings. The fluid that has passed through the inner spaces of the first and second housings is then received by the heat exchange unit to perform heat exchange.

In the case of the heat exchange unit, a heat exchange unit connected to the first housing and a heat exchange unit connected to the second housing are provided, and these heat exchange units may be installed by stacking.

A flow forming plate and a partition plate may be provided to form a flow path, so that a fluid of a predetermined temperature supplied from the heat exchange unit flows through the space between the racks installed in the first housing and the racks installed in the second housing, and between the racks installed in the second housing and the ceiling surface of the second housing.

A plurality of racks installed in the first inner space and the second inner space are arranged in a row. The partition plate may be installed in the rack so as to selectively open and close the space between the rows of the rack.

The partition plate may include a plate-shaped partition plate body, and a hinge that rotates the partition plate body with respect to a rack when pressure formed in the inner space exceeds a predetermined level.

A first top plate may be provided along the edge of the upper surface of the first housing, and a sealing member to which the second housing is seated may be further provided on the first top plate.

A waterproof plate connecting between the first housing and the second housing seated on the sealing member may be further provided to shield the sealing member.

A waterproof fence is further provided along the front end of the first top plate to prevent moisture falling on the first top plate from being transferred to the first inner space.

The housing stacking energy storage system of the present disclosure may include: a first housing having a first inner space therein; a second housing mounted and stacked on the first housing and having a second inner space therein; a plurality of battery packs mounted on racks installed in the first inner space and the second inner space; a pressure discharge plate provided on an upper surface of the second housing, and torn open by pressure when the pressure of the first inner space and the second inner space exceed a predetermined level to discharge the pressure to the outside; a heat exchange unit supplying a fluid at a predetermined temperature to the first and second inner spaces and receiving the fluid flowing in the first and second inner spaces to perform heat exchange; and a control unit controlling charging and discharging of the battery pack.

A flow forming plate and a partition plate may be provided to form a flow path, so that a fluid of a predetermined temperature supplied from the heat exchange unit flows through the space between the racks installed in the first and second housings, and between the racks installed in the second housing and the ceiling surface of the second housing.

A plurality of racks installed in the first inner space and the second inner space are arranged in a row. The partition plate may be installed in the rack so as to selectively open and close the space between the rows of the rack.

The partition plate may include a plate-shaped partition plate body, and a hinge that rotates the partition plate body with respect to a rack when pressure formed in the inner space exceeds a predetermined level.

The partition plate may be installed at an upper end of a space between rows of racks disposed in the first inner space.

The partition plate may be installed at an upper end and a lower end of a space between rows of racks disposed in the second inner space.

Components constituting the control unit may be installed inside the first and second housings. Additionally, a fire extinguishing system and a spray system may be further provided inside the first housing and the second housing.

The spray system may be installed in the second inner space of the second housing.

In the case of the heat exchange unit, a heat exchange unit connected to the first housing and a heat exchange unit connected to the second housing are provided, and these heat exchange units may be installed by stacking.

An exhaust unit may be further provided to flow air between the inner spaces and the outside of the first housing and the second housing.

The exhaust unit may be provided in a pair of a suction side exhaust unit having a damper and a discharge side exhaust unit having a fan.

The suction side exhaust unit may be located on a lower side of the first housing and the second housing, and the discharge side exhaust unit may be located on an upper side of the first housing and the second housing.

Advantageous Effects

The housing stacking energy storage system of the present disclosure may have at least one or more of the following effects.

The energy storage system of the present disclosure may provide a relatively large capacity compared to the area for installing the energy storage system by stacking the first housing and the second housing constituting the exterior.

In the present disclosure, the first housing and the second housing constituting the exterior of the energy storage system may be separately manufactured. Therefore, it is very convenient to manufacture or transport the first housing and the second housing.

In the present disclosure, the insides of the stacked first housing and the second housing are communicated as one space. Therefore, the space formed inside the first housing and the second housing may be managed as one, and more battery cells may be installed to increase the capacity while using relatively few parts to configure the system.

In the present disclosure, since the first housing and the second housing have a standardized size that may be transported using standardized transportation means, it is convenient to transport the first housing and the second housing. In addition, most of the components including the battery packs installed inside the first housing and the second housing are transported to the installation site in a factory-assembled state and only need to be installed (structured) at the site.

In the present disclosure, housings having standardized sizes are directly stacked and the stacked housings are fastened to each other. Therefore, it is relatively easy to combine the housings, and the housing located on the upper part is stably supported so as to have a high resistance to lateral loads applied from the external environment.

In the present disclosure, the upper housing and the lower housing are connected using an anti-sag bracket that supports the sagging of the housing at the upper part to ensure that the overall structure is stable.

In the present disclosure, a flow forming plate and a partition plate are used to separate air flow for heat dissipation between rows of racks installed in the first housing and the second housing and between the rack and the inner surface of the housing. The partition plate is opened in an emergency to smoothly discharge pressure through a pressure discharge plate. Thus, in the energy storage system formed by stacking the first housing and the second housing, heat is smoothly dissipated and pressure is smoothly discharged in an emergency.

In the present disclosure, a pressure discharge plate is placed in the stacked upper housing. The pressure discharge plate is torn open when a predetermined level of pressure or more is generated inside the housing to discharge pressure to the outside. Even if an abnormal pressure is generated in the lower housing, the pressure is discharged through the pressure discharge plate through the opening of the partition plate, without damaging the housing.

BEST MODE FOR DISCLOSURE

Figure 1:
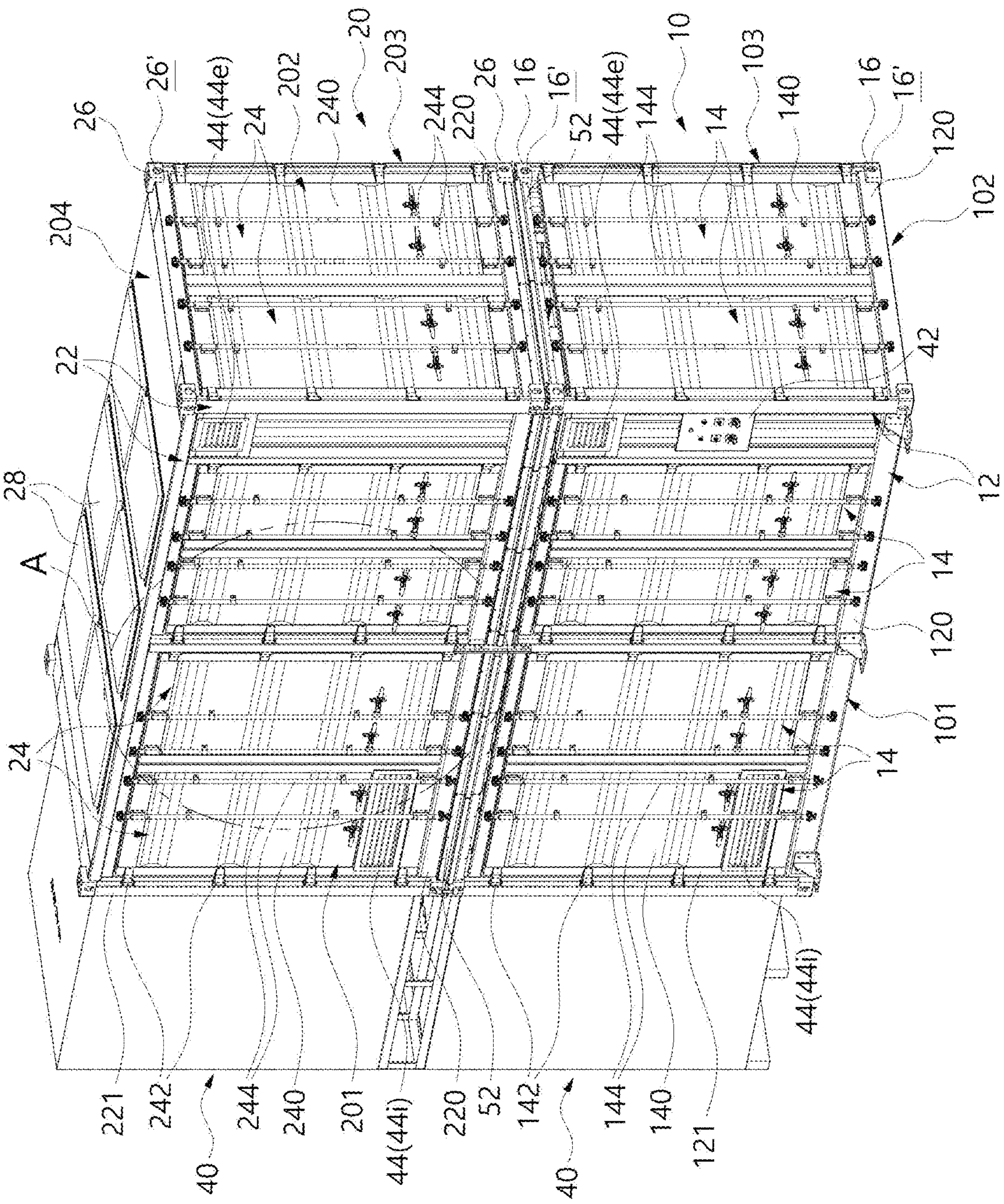
FIG. 1 is a perspective view showing a preferred embodiment of the housing stacking energy storage system according to the present disclosure.

Hereinafter, some embodiments of the present disclosure will be described in detail with reference to exemplary drawings. In assigning reference numerals to the components of each drawing, it should be noted that the same components are given the same reference numerals as much as possible even though the same components are indicated on different drawings. In addition, in describing the embodiment of the present disclosure, if it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), (b), etc. may be used. These terms are only used to distinguish between the components, and the nature, or order of the components are not limited by the terms. When a component is described as being “combined with”, “coupled to” or “connected to” another component, the component may be directly connected to or combined with each other, but it should be understood that another component may be “connected to”, “coupled to” or “combined with” each of the components therebetween.

In the energy storage system of the present disclosure, a first housing 10 and a second housing 20 may form an external appearance. The first housing 10 is placed on the ground and the second housing 20 is placed on the first housing 10. The first housing 10 and the second housing 20 may have the same or similar shape and size as, for example, a 20 ft container.

This is to facilitate the transfer of the first housing 10 and the second housing 20. That is, in order to transport the first housing 10 and the second housing 20 using a standardized means of transport, the first housing 10 and the second housing 20 are to have such shapes and dimensions.

The first housing 10 may have a front surface 101, two side surfaces 102, a rear surface 103, and a bottom surface (no reference numerals are assigned) with reference to FIG. 1. Most of an upper surface 104 of the first housing 10 may be opened. As the bottom surface of the first housing 10 is not opened, it may be blocked from the environment around the floor. A rack 30 to be described below may be installed on the bottom surface of the first housing 10.

A first inner space 11 is formed inside the first housing 10. Various components, to be described below, including a rack 30 and a battery pack 32 mounted thereon may be disposed in the first inner space 11. For reference, the first inner space 11 communicates with a second inner space 21 of the second housing 20 to be described below. For this purpose, the upper surface 104 of the first housing 10 may be in an open state. By opening the upper surface 104, the second inner space 21 of the second housing 20 and the first inner space 11 may communicate with each other, thereby forming one space as a whole.

The first housing 10 may have a rectangular parallelepiped shape. A first housing frame 12 may form the skeleton of the first housing 10. The first housing frame 12 is configured such that a plurality of members are connected horizontally and vertically, and a plate or the like may be mounted thereon. In this embodiment, in describing the structure of the first housing frame 12, reference numerals are assigned to only necessary members for convenience. The first housing frame 12 includes a horizontal member 120 and a vertical member 121, which may be coupled together. These horizontal members 120 and vertical members 121 may form a part of the outer surface and skeleton of the first housing frame 12.

Figure 6:
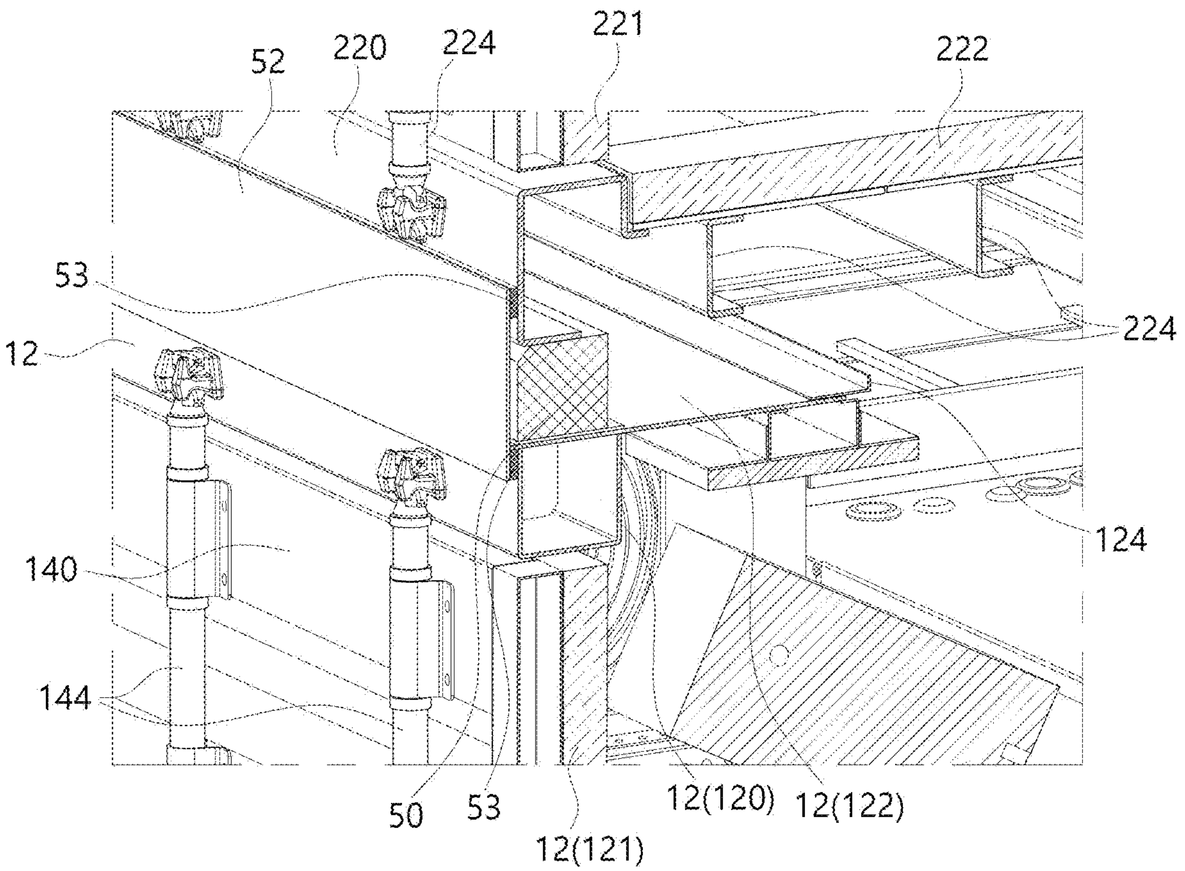
FIG. 6 is a cross-sectional perspective view showing a configuration of a portion where a first housing and a second housing are connected in an embodiment of the present disclosure.

As shown in FIG. 6, a first top plate 122 may be provided around the inner side of the upper end of the first housing frame 12. The first top plate 122 may extend horizontally from one side of the first housing frame 12, more specifically, from the horizontal member 120. The first top plate 122 is positioned along the inner edge of the upper surface 104 of the first housing 10, and a waterproof fence 124 may be provided along the edge of the first top plate 122. The waterproof fence 124 prevents moisture falling on the first top plate 122 from falling downwardly from the first top plate 122. The waterproof fence 124 may be formed to be orthogonal to the first top plate 122.

Figure 5:
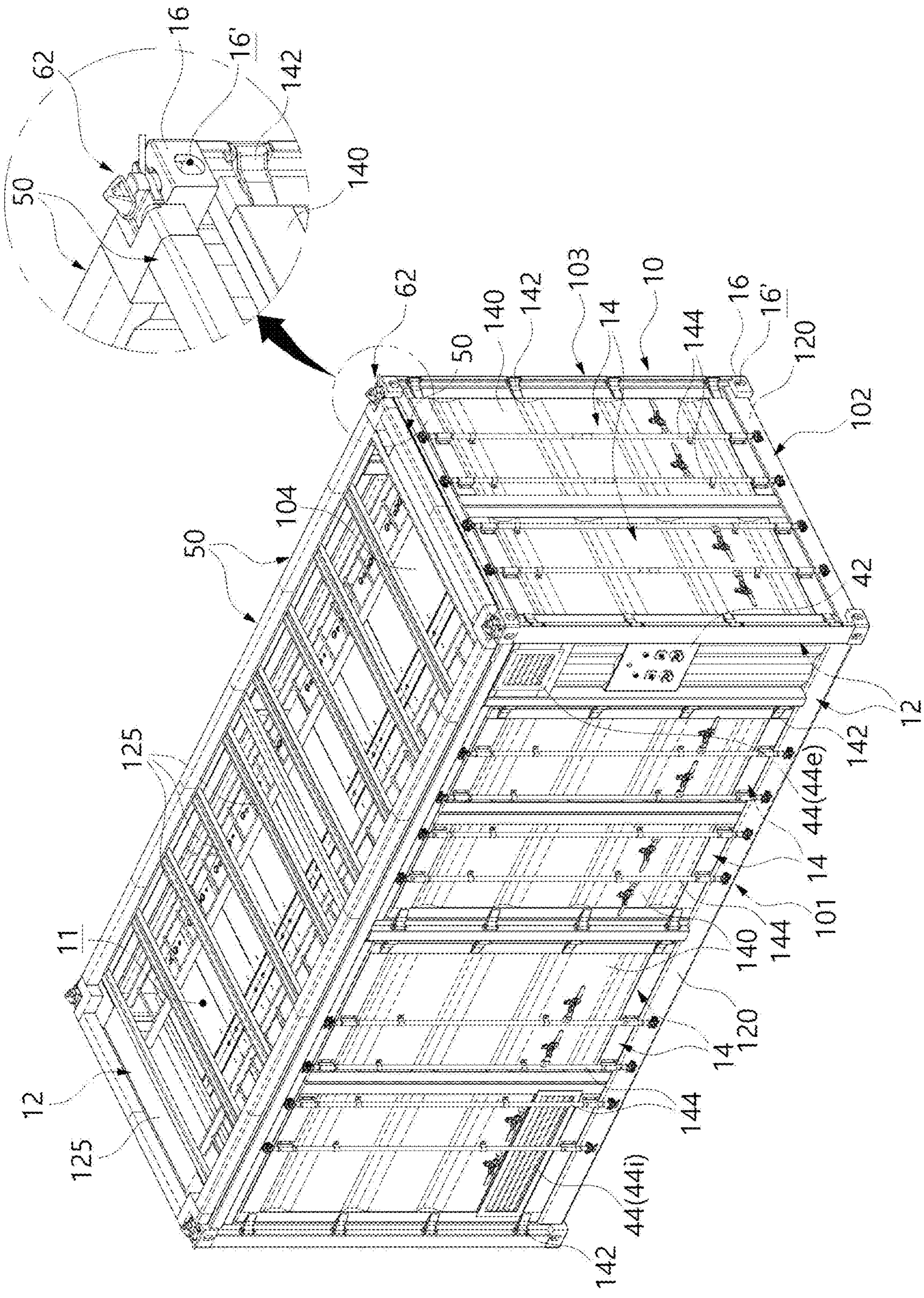
FIG. 5 is a perspective view and an enlarged view showing a first housing and its internal configuration constituting an embodiment of the present disclosure.

A plurality of connecting members 125 may be used to reinforce the strength of the first housing frame 12 in the front-rear direction, as shown in FIG. 5.

The first housing frame 12 has a first door unit 14. The first door unit 14 is provided on the front surface 101, side surface 102, and rear surface 103 of the first housing 10 to enable access to the first inner space 11. The first door unit 14 may be configured to open and close as a pair of two. The first door unit 14 may include a door body 140 that shields an open part of the first housing frame 12 and a door hinge 142 for connecting the door body 140 to the first housing frame 12 to be opened and closed.

The door body 140 may have a rectangular shape in the present embodiment, but does not necessarily have to, and may have any shape capable of accessing the first inner space 11 for maintenance of a battery pack or the like. The door hinge 142 is for opening and closing the door body 140. A locking bar assembly 144 may be provided on an outer surface of the door body 140. The locking bar assembly 144, in a state in which a part thereof is installed in the door body 140 to be lifted, has an end inserted into one side of the first housing frame 12 to prevent the opening of the first door unit 14.

A first fastening part 16 is provided at the corner of the first housing 10. The first fastening part 16 has a hexahedral shape, and has a first fastening holes 16' connected to each other so as to be open to three surfaces exposed to the outside. The first fastening part 16 performs a function of fixing the first housing 10 itself during transportation and a function of mutual fastening with the second housing 20 to be described below.

The second housing 20 may be directly mounted on the top of the first housing 10. The second housing 20 has almost the same appearance and size as the first housing 10. The second inner space 21 is formed inside the second housing 20. The second housing 20 may have a front surface 201, two side surfaces 202, a rear surface 203, and an upper surface 204. The bottom of the second housing 20 is open. Accordingly, the first inner space 11 of the first housing 10 and the second inner space 21 of the second housing 20 communicate with each other to form a single space. That is, when the bottom of the second housing 20 is open and the top of the first housing 10 is open, and the second housing 20 is stacked on the first housing 10, inside the first housing 10 and the second housing 20, the first inner space 11 and the second inner space 21 may form one space.

The second housing 20 may have a rectangular parallelepiped shape. A second housing frame 22 may form the skeleton of the second housing 20. The second housing frame 22 is configured such that a plurality of members are connected horizontally and vertically, and a plate or the like may be mounted thereon. In this embodiment, in describing the structure of the second housing frame 22, reference numerals are assigned to only necessary members for convenience. The second housing frame 22 includes a horizontal member 220 and a vertical member 221, which may be coupled together. These horizontal members 220 and vertical members 221 may form a part of the outer surface and skeleton of the second housing frame 22. In FIG. 6, a connecting member 222 and a horizontal connecting member 224 are installed orthogonally to each other at the bottom of the second housing 20, and each of them may be coupled to a horizontal member 220 or a vertical member 221 constituting the second housing frame 22. With this configuration, a rack 30 may be seated on the connecting member 222 and the horizontal connecting member 224.

The second housing frame 22 has a second door unit 24. The second door unit 24 is provided on the front surface 201, side surface 202, and rear surface 203 of the second housing 20 to enable access to the second inner space 21. The second door unit 24 may be configured to open and close as a pair of two. The second door unit 24 may include a door body 240 that shields an open part of the second housing frame 22 and a door hinge 242 for connecting the door body 240 to the second housing frame 22 to be opened and closed.

The door body 240 may have a rectangular shape in the present embodiment, but does not necessarily have to, and may have any shape capable of accessing the second inner space 21 for maintenance of a battery pack or the like. The door hinge 242 is for opening and closing the door body 240. A locking bar assembly 244 may be provided on an outer surface of the door body 240. The locking bar assembly 244 is for locking the closed state of the door body 240. The locking bar assembly 244 has the same configuration and function as the locking bar assembly 144 of the first door unit 14.

A second fastening part 26 is provided at the corners of the second housing 20. The second fastening part 16 has a hexahedral shape, and has a second fastening holes 26' connected to each other so as to be open to three surfaces exposed to the outside. The second fastening part 16 performs a function of fixing the second housing 10 itself during transportation and a function of mutual fastening with the first housing 10.

A plurality of pressure discharge plates 28 are provided on the upper surface 204 of the second housing 20. The pressure discharge plate 28 discharges an abnormal pressure to the outside when explosion or deflagration occurs in the inner spaces 11 and 21 of the first housing 10 and the second housing 20. The configuration of the pressure discharge plate 28 is to discharge the pressure to the outside while being torn open when the pressure in the inner spaces 11 and 21 reaches a predetermined value or more. In this way, the pressure may be discharged to the outside through the pressure discharge plate 28 without damaging other components of the first housing 10 and the second housing 20.

A plurality of racks 30 are installed in the first inner space 11 of the first housing 10 and the second inner space 21 of the second housing 20. The racks 30 in the first inner space 11 are supported by the first housing frame 12 of the first housing 10, and the racks 30 in the second inner space 21 are supported by the second housing frame 22. In this way, the first housing 10 and the second housing 20 may be transferred while the rack 30 and the battery pack 32 are mounted thereon.

Figure 8:
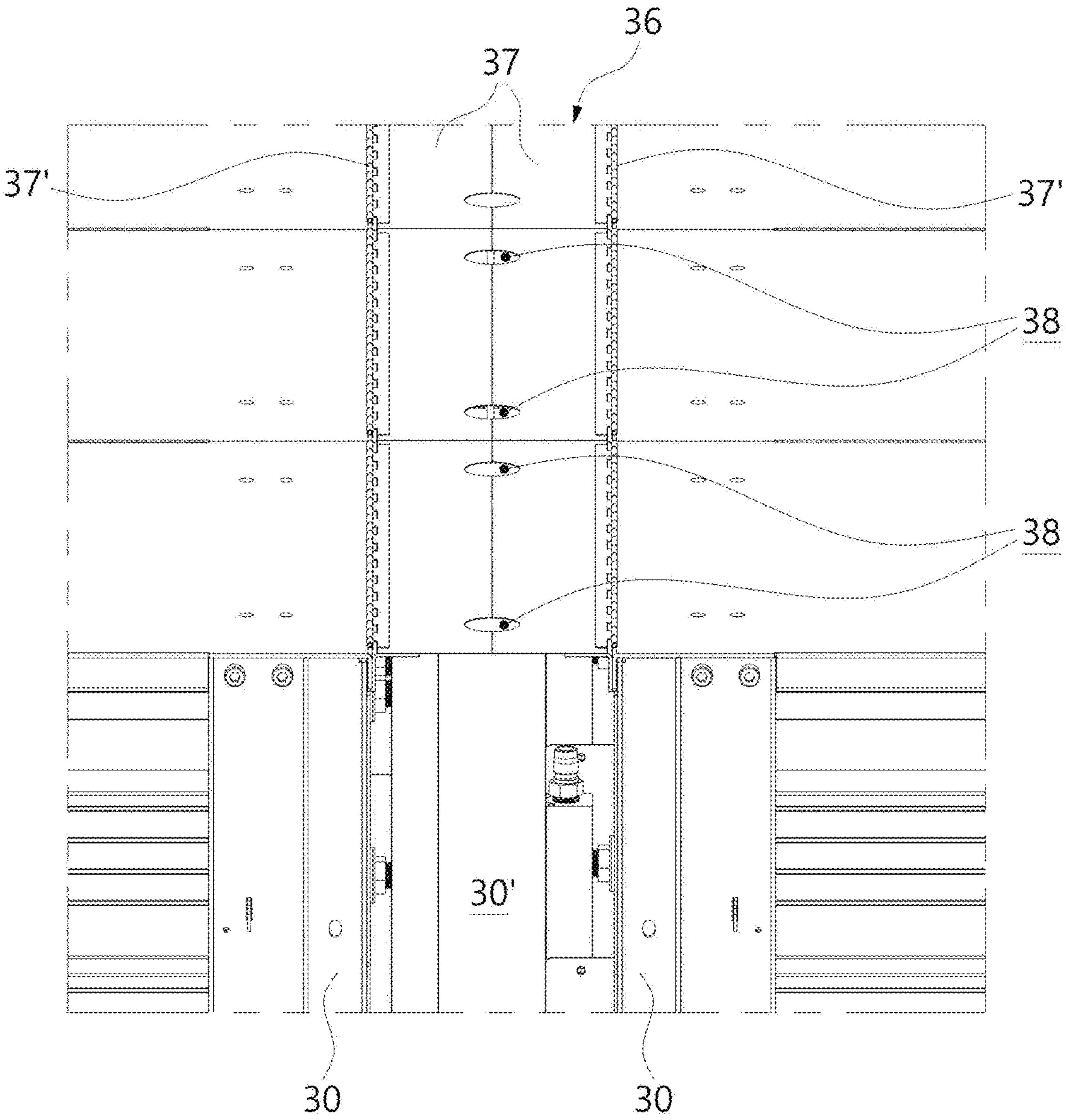
FIG. 8 is an enlarged perspective view showing a partition plate and its surrounding configurations shown in FIG. 7.

A plurality of battery packs 32 may be installed on the rack 30. The battery packs 32 are installed on the rack 30 with their front surfaces facing the door units 14 and 24. Accordingly, the rear surface of the battery pack 32 is positioned toward the space 30' (see FIG. 8) defined between the two rows of the rack 30. The level of the output voltage may be adjusted according to the number of the battery packs 32 connected in series.

Figure 7:
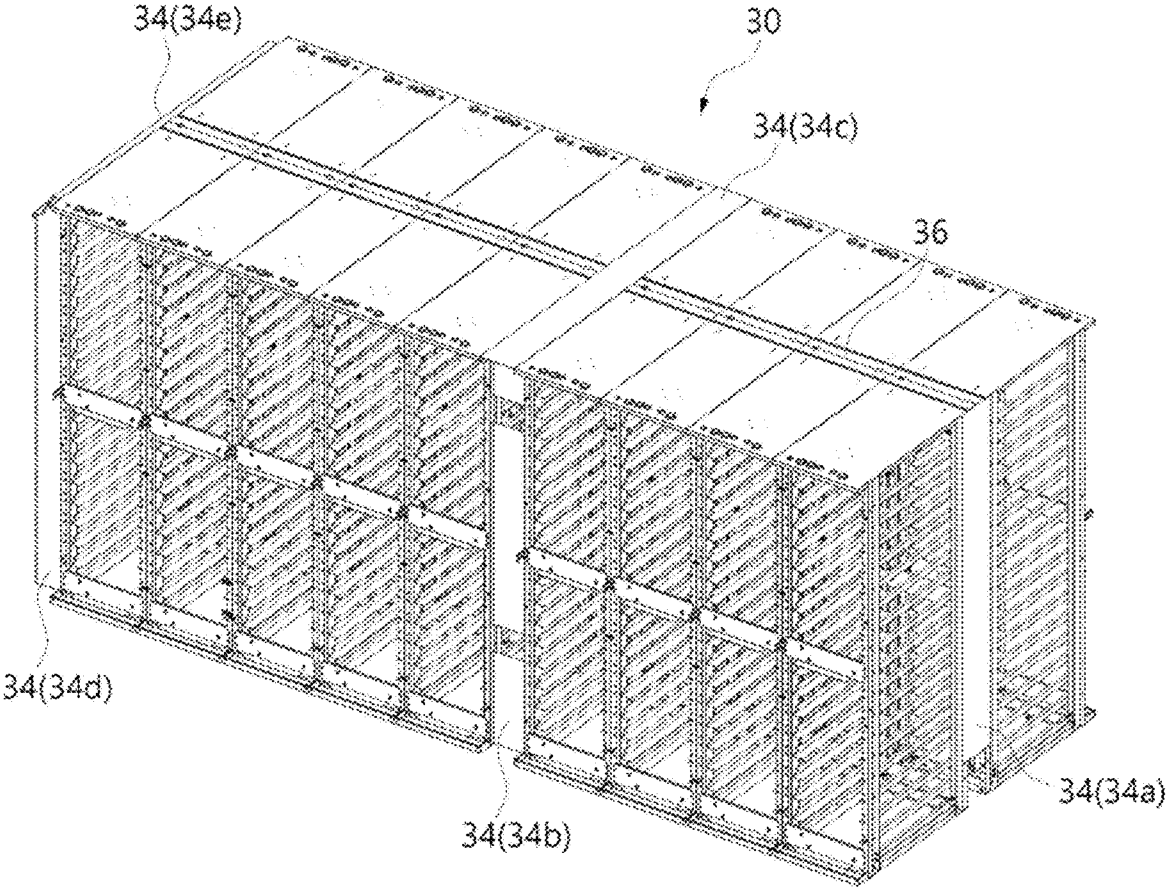
FIG. 7 is a perspective view showing a configuration for forming a flow path between racks installed in a first housing or a second housing and a row of racks in an embodiment of the present disclosure.

In FIG. 7, for example, the rack 30 disposed in the first inner space 11 or the second inner space 21 and a configuration related thereto are illustrated. As may be seen here, the racks 30 are arranged in a front line and a rear line based on the drawing. A flow path through which air may flow is formed through the space 30' between the rows of the racks 30. Separate flow forming plates 34 are installed for this purpose.

As seen in FIG. 7, a flow forming plate 34*a* is provided to block the side in the space 30' between the front row and the rear row of the rack 30. For example, flow forming plates 34*b*, 34*c* may be installed in the part of the first housing frame 12 where the door hinge 142 of the first door unit 14 is mounted. More specifically, there are flow forming plates 34*b*, 34*c* that block a space where the rack 30 may not be installed because it is an area corresponding to the back of the vertical member 121. In addition, flow forming plates 34*d*, 34*e* that form a flow path between the rack 30 and a heat exchange unit 40 to be described below are connected to the rack 30. The flow forming plate not shown in the drawings is not assigned a reference numeral. By the use of the flow forming plate, a path through which relatively low temperature air flows and a path through which high temperature air flows may be separated, thereby efficiently dissipating heat generated from the battery pack 32.

Meanwhile, a partition plate 36 may be provided to block the upper part of the space 30' (see FIG. 8) between the rows of the rack 30. The partition plate 36 forms a flow path in cooperation with the flow forming plate 34. There are other positions in which the partition plate 36 and the flow forming plate 34 are installed.

Figure 9:
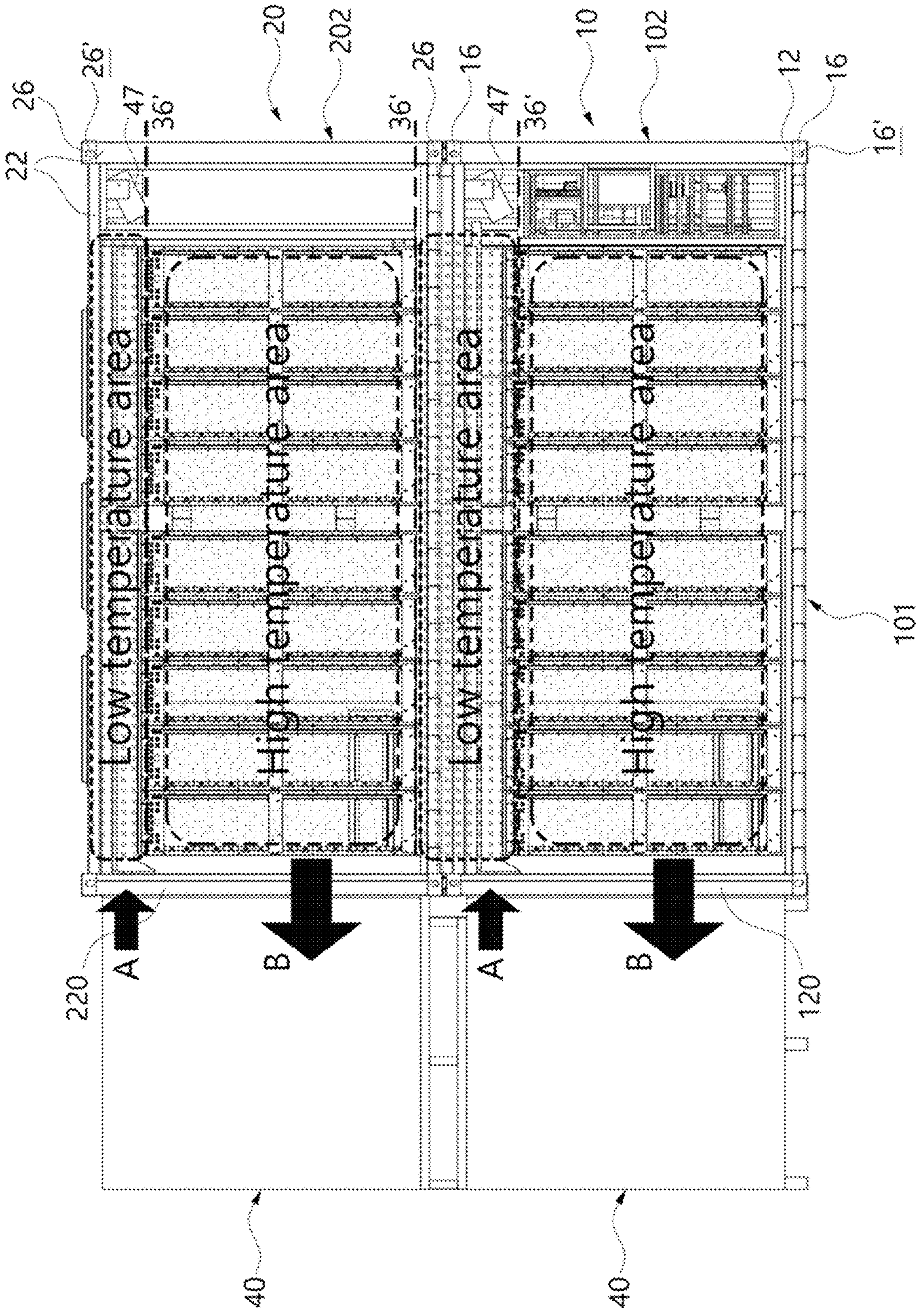
FIG. 9 is an explanatory view showing air flow inside the first housing and the second housing by a heat exchange unit.

The partition plate 36 may be positioned along the portion indicated by the dotted line 36' in FIG. 9. That is, the separator plate 36 may be positioned at the top between the rows of racks 30 installed in the first housing 10 and at the top and bottom between the rows of racks 30 installed in the second housing 10, respectively. Of course, the flow forming plates 34 together with the partition plate 36 are also located at corresponding positions. In this way, the flow path may be divided as shown in FIG. 9 by the partition plate 36 and the flow forming plate 34. That is, the low-temperature region where relatively low-temperature air flows, indicated by arrow A, is located in the upper part of the first housing 10 and the second housing 20.

Then, there is a high-temperature region where high-temperature air due to heat generated by the battery cell 32 flows in the direction indicated by arrow B. The high-temperature region corresponds to a region where the battery cell 32 is located.

As such, the upper regions of the first housing 10 and the second housing 20 may be regions where relatively low temperature air may flow by the flow forming plate 34 and the partition plate 36. Accordingly, the air flow in the inner spaces 11 and 21 is constantly maintained so that heat may be uniformly removed from the region where the battery cells 32 are located and then transferred to the heat exchange unit 40.

Meanwhile, the partition plate 36 may be open by a predetermined pressure or more. For this purpose, the partition plate 36 is configured such that a plate-shaped partition plate body 37 may be open at a predetermined angle by a hinge 37'. When the pressure in the space 30' is greater than or equal to a predetermined level, the partition plate 36 is open by the pressure so that the pressure may be discharged. The two partition plates 36 are configured to form a pair, open in a direction away from each other, and close in a direction close to each other. A semicircular through-hole is formed at a front end of the partition plate body 37, respectively, and both sides are combined to form a circular hose through hole 38. The hose through hole 38 is a portion through which a hose of a spray system 48, to be described below, passes.

As described above, the partition plate 36 may be located in a plurality of places. The partition plate 36 normally functions to divide a space to form a flow path, but is opened in an emergency so that pressure may be transferred toward the pressure discharge plate 28.

There may be a heat exchange unit 40 for supplying air or water at a predetermined temperature to the first housing 10 and the second housing 20. The first housing 10 and the second housing 20 may have one heat exchange unit 40 respectively at corresponding positions. In this case, the heat exchange units 40 are stacked and installed like the first housing 10 and the second housing 20. However, one heat exchange unit 40 may supply air at a predetermined temperature to both the first housing 10 and the second housing 20. As in the illustrated embodiment, the heat exchange unit 40 may use an air conditioning unit. However, it may use, for example, a chiller using that uses cooling water. As in the illustrated embodiment, the heat exchange unit 40 using an air conditioning unit that uses air as a heat exchange medium may provide air by controlling various physical properties such as humidity as well as the temperature of the air.

A control panel 42 may be located on one side of the outer surface of the first housing 10. The control panel 42 may be located at a central height of one side of the outer surface of the first housing 10. The control panel 42 may display an operational status of the system of the present disclosure. In addition, the control panel 42 is configured to perform power shutdown in an emergency. That is, an emergency shutdown switch may be placed on the control panel 42. The control panel 42 is referenced to FIG. 1.

Exhaust units 44 may be placed in a plurality of places in the first housing 10 and the second housing 20. The exhaust unit 44 may flow air into and out of the inner spaces 11 and 21 under certain circumstances. For example, when a fire occurs inside and gas such as smoke is filled with a predetermined pressure or more, it may be actively exhausted to the outside through the exhaust unit 44.

As shown in FIG. 1, the exhaust unit 44 may be provided in various positions of the first housing 10 and the second housing 20. The exhaust unit 44 may be divided into a suction side 44*i* and a discharge side 44*e*. In the illustrated embodiment, the discharge side 44*e* is installed adjacent to a corner of the relatively upper portion of the first housing 10 and the second housing 20. Here, a discharge fan (not shown) is provided so that the gas inside may be forcibly discharged to the outside. Among the exhaust units 44, the suction sides 44*i* are placed below the door bodies 140 and 240 of the door units 14 and 24 so that air is sucked into the inner spaces 11 and 21 from the outside. Gas including smoke is discharged through the discharge side exhaust unit 44*e*, while outside air is introduced into the inner spaces 11 and 21 through the suction side exhaust unit 44*i*. The suction side exhaust unit 44*i* has a damper (not shown) to prevent outside air from being sucked in during normal operation.

Figure 4:
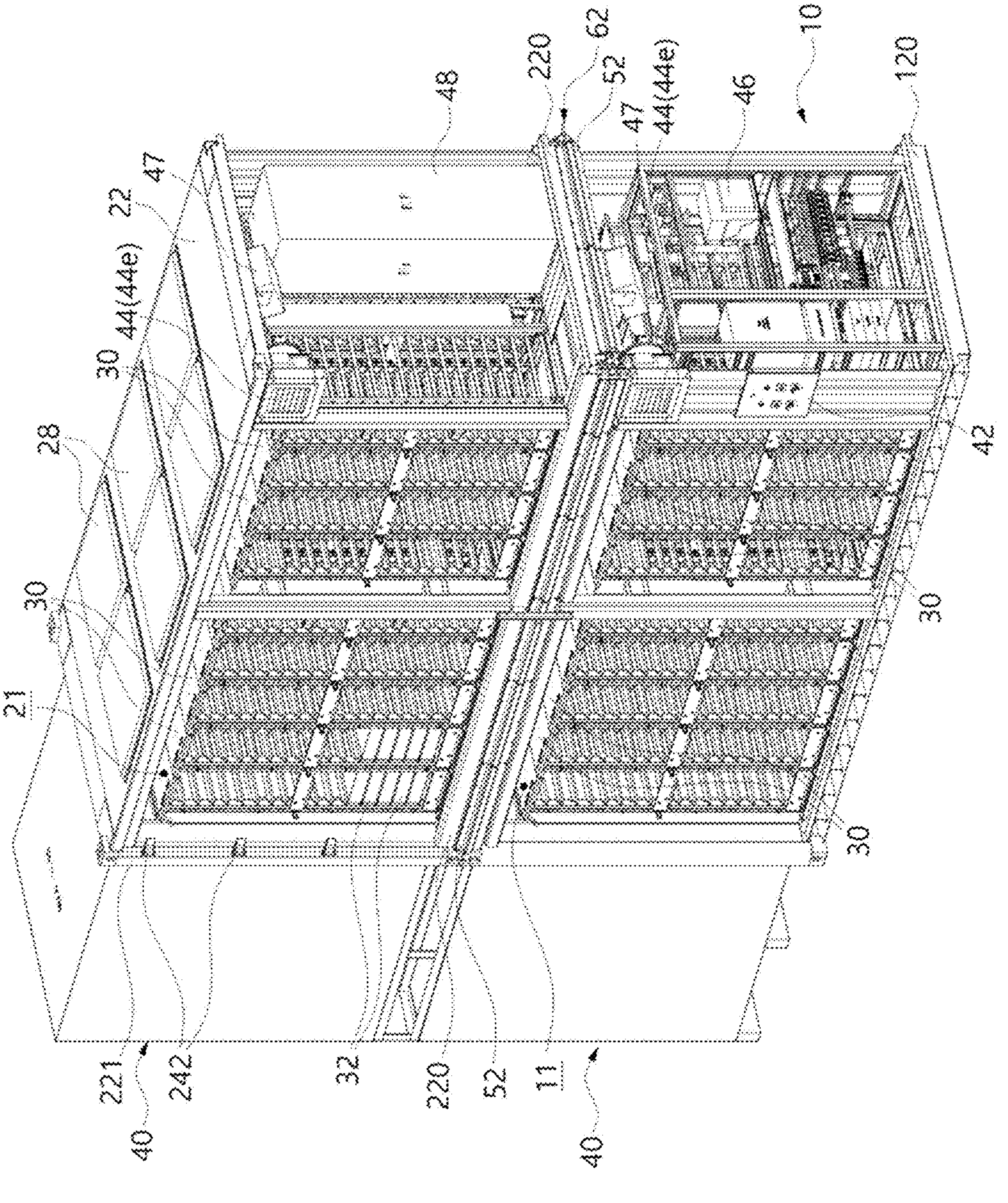
FIG. 4 is a perspective view showing parts installed in the first inner space and the second inner space by removing parts of the first housing and the second housing in the embodiment shown in FIG. 1.

As shown in FIG. 4, a control unit 46 may be installed on one side of the first inner space 11 of the first housing 10. The control unit 46 may have battery protection, power supply, and communication functions. In this embodiment, the control unit 46 is installed only in the first housing 10. Alternatively, the control unit 46 may be installed only on one side of the second inner space 21 of the second housing 20.

As shown in FIG. 4, the first inner space 11 and the second inner space 21 may each be provided with a fire extinguishing system 47. The fire extinguishing system 47 may spray, for example, an aerosol containing a fire extinguishing agent. The fire extinguishing system 47 may serve to detect and extinguish a fire when a fire occurs in the battery pack 32 or the like in the rack 30.

A spray system 48 may be provided at one side of the second inner space 21. The spray system 48 supplies water directly to a specific battery pack when a fire occurs in the battery pack. In the present embodiment, the spray system 48 is installed in the second inner space 21. Considering the height of the supplied water, it is preferable to install the spray system 48 in the second inner space 21 rather than in the first inner space 11.

A configuration of a part where the second housing 20 is stacked in the first housing 10 will be described. As shown in FIG. 6, a sealing member 50 may be installed around the edge of the first top plate 122 of the first housing 10. The sealing member 50 may be made of an elastic material. The sealing member 50 may be made of urethane. The second housing 20 may be seated on the sealing member 50. This state is shown in FIG. 6.

A waterproof plate 52 may be installed simultaneously on the first housing 10 and the second housing 20 so that the sealing member 50 is not exposed to the outside. That is, the waterproof plate 52 is installed along the upper periphery of the first housing 10 and the lower periphery of the second housing 20. The installed state of the waterproof plate 52 is well shown in FIG. 6. When the waterproof plate 52 is installed on the first housing 10 and the second housing 20, a packing 53 may be interposed therebetween. The waterproof plate 52 may be installed along a portion where the first housing 10 and the second housing 20 meet.

An anti-sag bracket 56 is used to better support the load of the second housing 20 stacked on the first housing 10 so that there is no sagging. The anti-sag bracket 56 supports the load of the second housing 20 by connecting the first housing frame 12 of the first housing 10 and the second housing frame 22 of the second housing 20. More specifically, the vertical member 121 of the first housing 10 and the vertical member 221 of the second housing 20 are connected.

Figure 10:
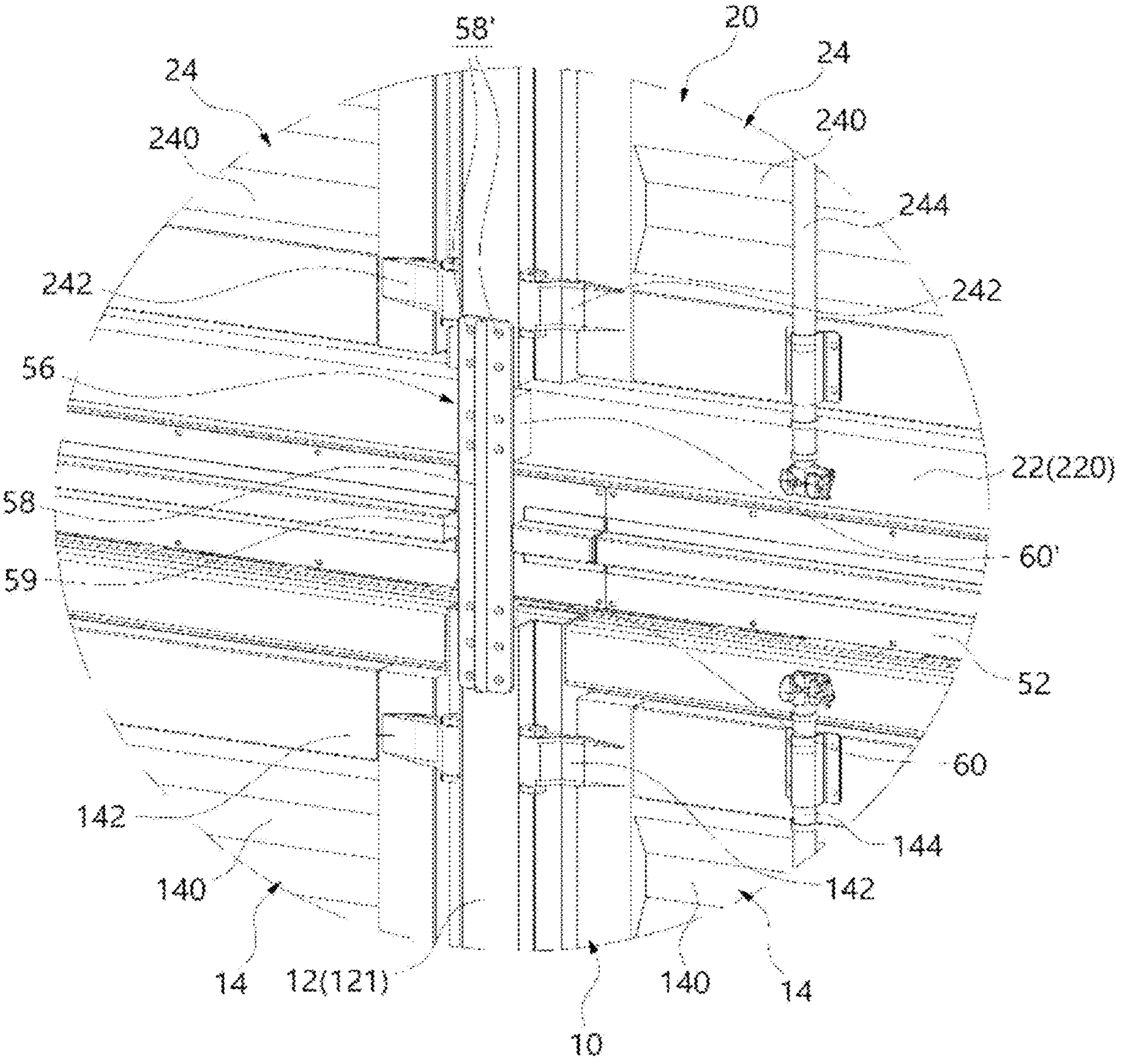
FIG. 10 is an enlarged view of part A of FIG. 2.
Figure 11:
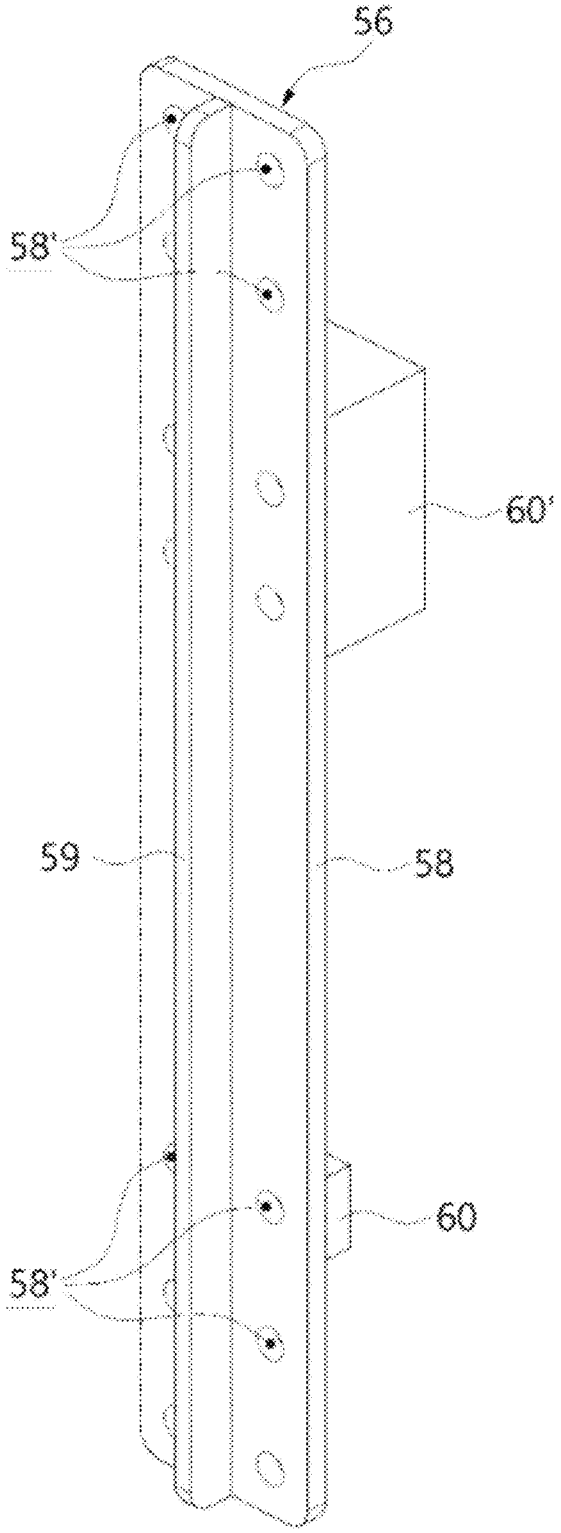
FIG. 11 is a perspective view showing the configuration of an anti-sag bracket used in the embodiment of the present disclosure.
Figure 12:
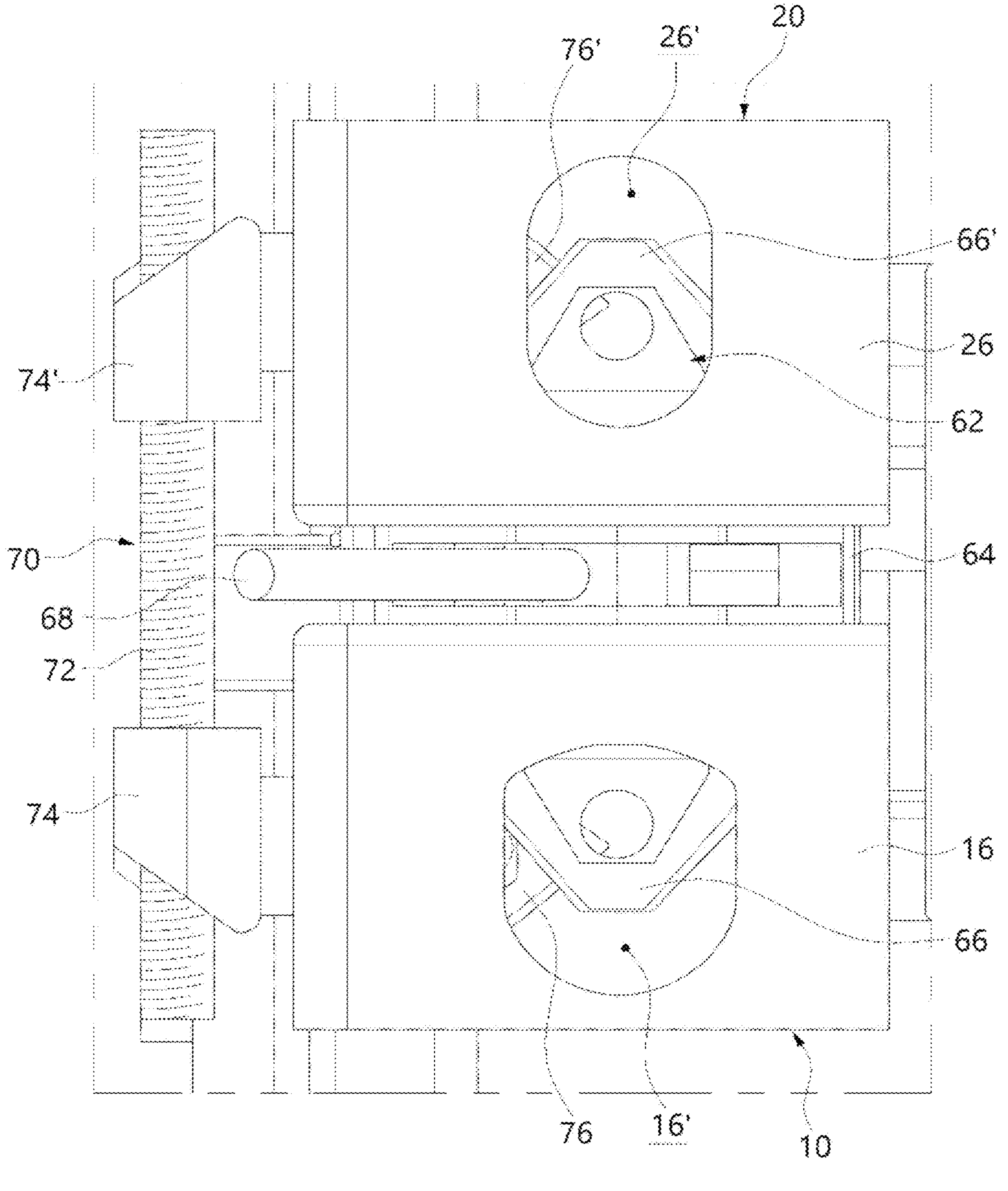
FIG. 12 is a front view showing that a first fastening part of the first housing and a second fastening part of the second housing are coupled by a twist lock mechanism and a bridge fitting in an embodiment of the present disclosure.
Figure 13:
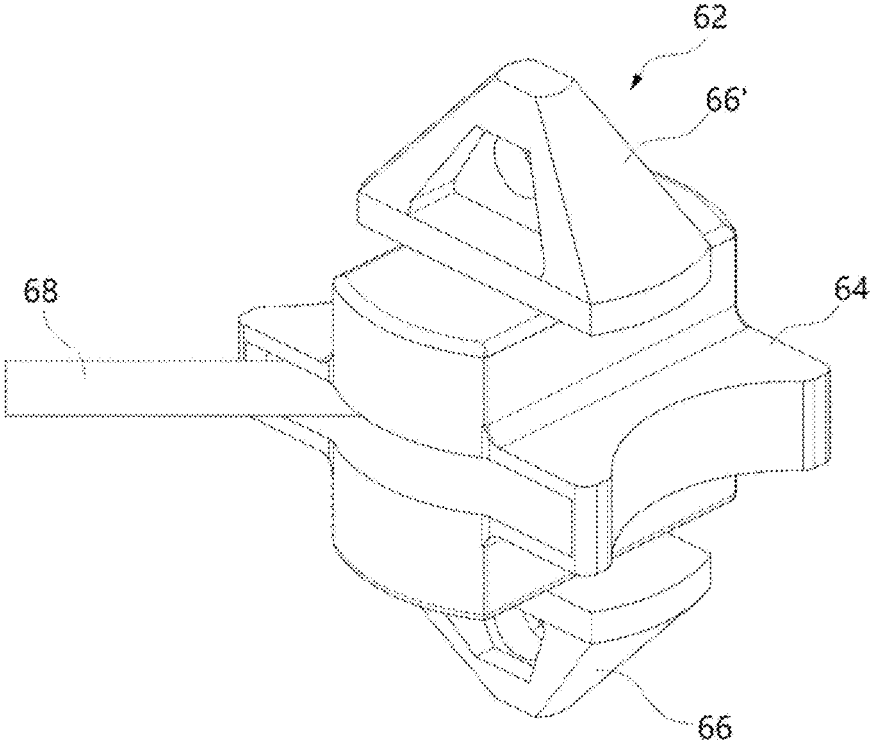
FIG. 13 is a perspective view showing the appearance of the twist lock mechanism.
Figure 14:
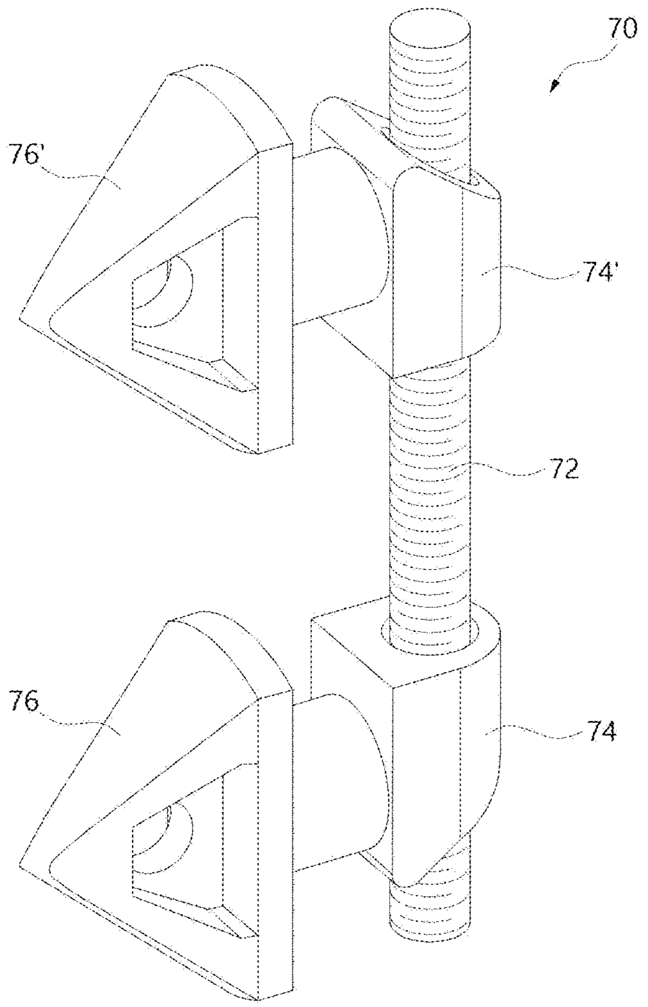
FIG. 14 is a perspective view showing the appearance of the bridge fitting.

The anti-sag bracket 56 is well illustrated in FIGS. 10 and 11. A protector body 58 forms the skeleton of the anti-sag bracket 56. The protector body 58 has a plate shape elongated in one direction. Reinforcing pieces 59 for reinforcing in the longitudinal direction of the protector body 58 are provided orthogonally to each other. The reinforcing piece 59 has a length substantially equal to the length of the protector body 58. A plurality of fastening holes 58' are formed at the upper and lower ends of the protector body 58.

The first spacer block 60 and the second spacer block 60' are mounted on one surface of the protector body 58. The first spacer block 60 and the second spacer block 60' may serve to fill a gap between the protector body 58 and the surfaces of the first and second housings 10 and 20. The first spacer block 60 is smaller in size than the second spacer block 60'. This is because the gap between the first housing 10 and the protector body 58 is smaller than the gap between the second housing 20 and the protector body 58.

Meanwhile, a configuration for more firmly fastening the first housing 10 and the second housing 20 will be described. The first fastening part 16 at the corner of the first housing 10 and the second fastening part 26 at the corner of the second housing 20 are fastened with a twist lock mechanism 62 and a bridge fitting 70. The twist lock mechanism 62 and the bridge fitting 70 may be used to maintain a double fastening state.

In the twist lock mechanism 62, a first lock projection 66 and a second lock projection 66' are installed on the upper and lower surfaces of a lock body 64 to be rotatable at a predetermined angle at the same time. The degree of rotation of the first lock projection 66 and the second lock projection 66' may be simultaneously adjusted by a knob 68. The first lock projection 66 is inserted into the first fastening hole 16' formed in the first fastening part 16 of the first housing 10, and the second lock projection 66' is inserted into the second fastening hole 26' formed in the second fastening part 26 of the second housing 20 and rotated by the operation of the knob 68. When the first lock projection 66 and the second lock projection 66' are rotated simultaneously by the operation of the knob 68, they are fastened to the first fastening part 16 and the second fastening part 26, respectively, so that the first housing 10 and the second housing 20 are hung together.

The bridge fitting 70 includes a screw rod 72. The screw rod 72 has a thread formed on the outer surface thereof. A first lifting body 74 is movably installed on the screw rod 72. The first lifting body 74 has a first lock projection 76, which may be inserted into and hung from the first fastening hole 16' of the first fastening part 16. A second lifting body 74' is movably installed on the screw rod 72. The second lifting body 74' has a second lock projection 76', which may be inserted into and hung from the second fastening hole 26' of the second fastening part 26.

The first lock projection 76 and the second lock projection 76' may be locked and released by the opposite movement of the first lifting body 74 and the second lifting body 74' according to the rotation of the screw rod 72. The bridge fitting 70 may also serve to ensure close contact between the first housing 10 and the second housing 20.

Hereinafter, the installation and use of the housing stacking type energy storage system according to the present disclosure having the above configuration will be described.

The housing stacking type energy storage system of the present disclosure is transported in a state in which most of the components are mounted inside the first housing 10 and the second housing 20. At this time, the first housing 10 and the second housing 20 are transported in a separate state. After being transported to a desired location, the first housing 10 and the second housing 20 undergo an installation process.

The first housing 10 is placed on the ground, and the second housing 20 is stacked on top the first housing 10. When the heat exchange unit 40 is installed and an electrical connection between the first housing 10 and the second housing 20 is made, it becomes usable.

A process of stacking the second housing 20 on the first housing 10 will be described in more detail. First, the sealing member 50 is placed around the first top plate 122 while the first housing 10 is seated on the ground. The sealing member 50 has a substantially rectangular frame shape and is positioned on the first top plate 122. For reference, the first top plate 122 is supported on the horizontal member 120.

Next, the lower edge of the second housing 20 is seated on the sealing member 50. Accordingly, the sealing member 50 supports the second housing 20 while being compressed by the load of the second housing 20.

The waterproof plate 52 is mounted so that the upper end of the first housing 10 and the lower end of the second housing 20 are simultaneously connected. At this time, a gasket 53 is interposed between the waterproof plate 52 and the first housing 10 and between the waterproof plate 52 and the second housing 20. With this structure, it is possible to prevent moisture from entering the inner spaces 11 and 21 from the outside. Even if moisture penetrates or is generated by condensation inside, when it falls on the first top plate 122, it is not transferred to the battery pack 32 of the first inner space 11 due to the waterproof fence 124.

The first housing 10 and the second housing 20 are connected using the anti-sag bracket 56 to prevent sagging due to the load of the second housing 20. That is, the anti-sag bracket 56 is mounted to connect between the vertical member 121 of the first housing 10 and the vertical member 221 of the second housing 20. The anti-sag bracket 56 may be mounted on the front and rear surfaces of the first housing 10 and the second housing 20, respectively.

In addition, in order to simultaneously fasten between the first housing 10 and the second housing 20 to each other, a twist lock mechanism 62 and/or a bridge fitting 70 are mounted on the first fastening part 16 and the second fastening part 26.

During operation of the energy storage system of the present disclosure is in use, a large amount of heat is generated in the battery cell 32. In order to dissipate this heat to the outside, relatively low temperature air is supplied from the heat exchange unit 40. Normally, a relatively low temperature air is supplied from the heat exchange unit 40 to the inner spaces 11 and 21 in the direction of arrow A, as shown in FIG. 9, through the flow path formed by the flow forming plate 34 and the partition plate 36. On the other hand, the air receiving the heat generated from the battery cells 32 moves in the direction of arrow B and enters the heat exchange unit 40 so that the heat may be dissipated to the outside.

If a fire occurs during operation, the fire extinguishing system 47 is activated. The fire extinguishing system 47 sprays a fire extinguishing liquid to extinguish the fire. Additionally, the spray system may supply water directly to the battery cell 32 on fire to extinguish the fire.

In addition, if the pressure in the inner spaces 11 and 21 increases due to a fire or the like, the pressure is discharged to the outside to prevent damage to the entire system. In this case, the partition plate 36 is operated to discharge the pressure while the flow paths are connected to each other, as indicated by a solid line arrow in FIG. 15. That is, when the partition plate body 37 rotates about the hinge 37 and opens, the flow path partitioned by the partition plate 36 is communicated with each other, and the flow path is connected from the first inner space 11 to the second inner space 21.

Figure 15:
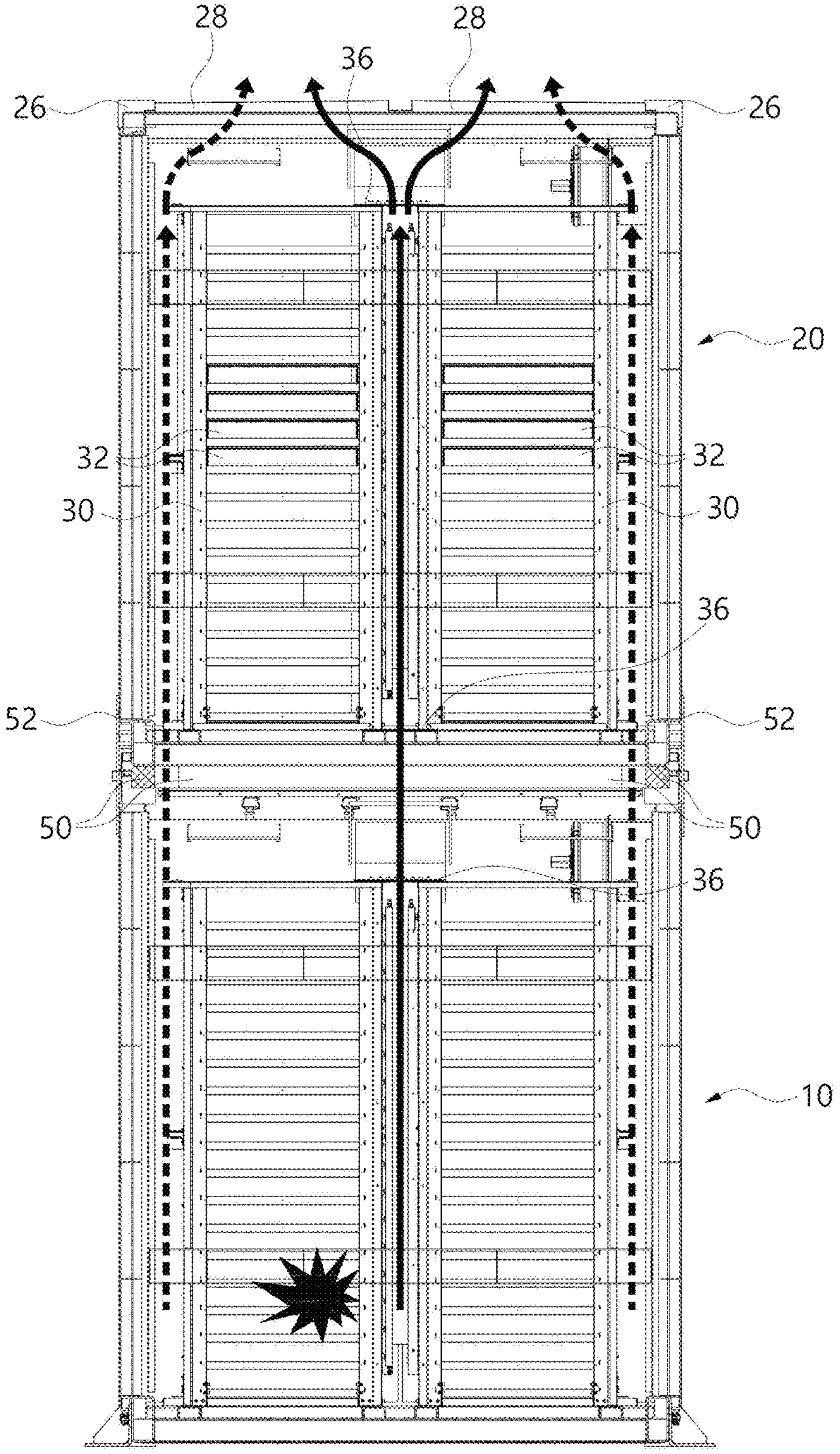
FIG. 15 is an explanatory view explaining that pressure is discharged to the outside through a pressure discharge plate in an embodiment of the present disclosure.

In particular, the pressure discharge plate 28 on the roof of the second housing 20 is torn open by the pressure transmitted when the partition plate 36 is opened, so that the pressure is well discharged to the outside. Accordingly, the pressure in the inner spaces 11 and 21 may be smoothly discharged without damaging the first housing 10 or the second housing 20. The dotted line in FIG. 15 shows that the pressure is discharged through the flow path formed even in normal times.

Figure 2:
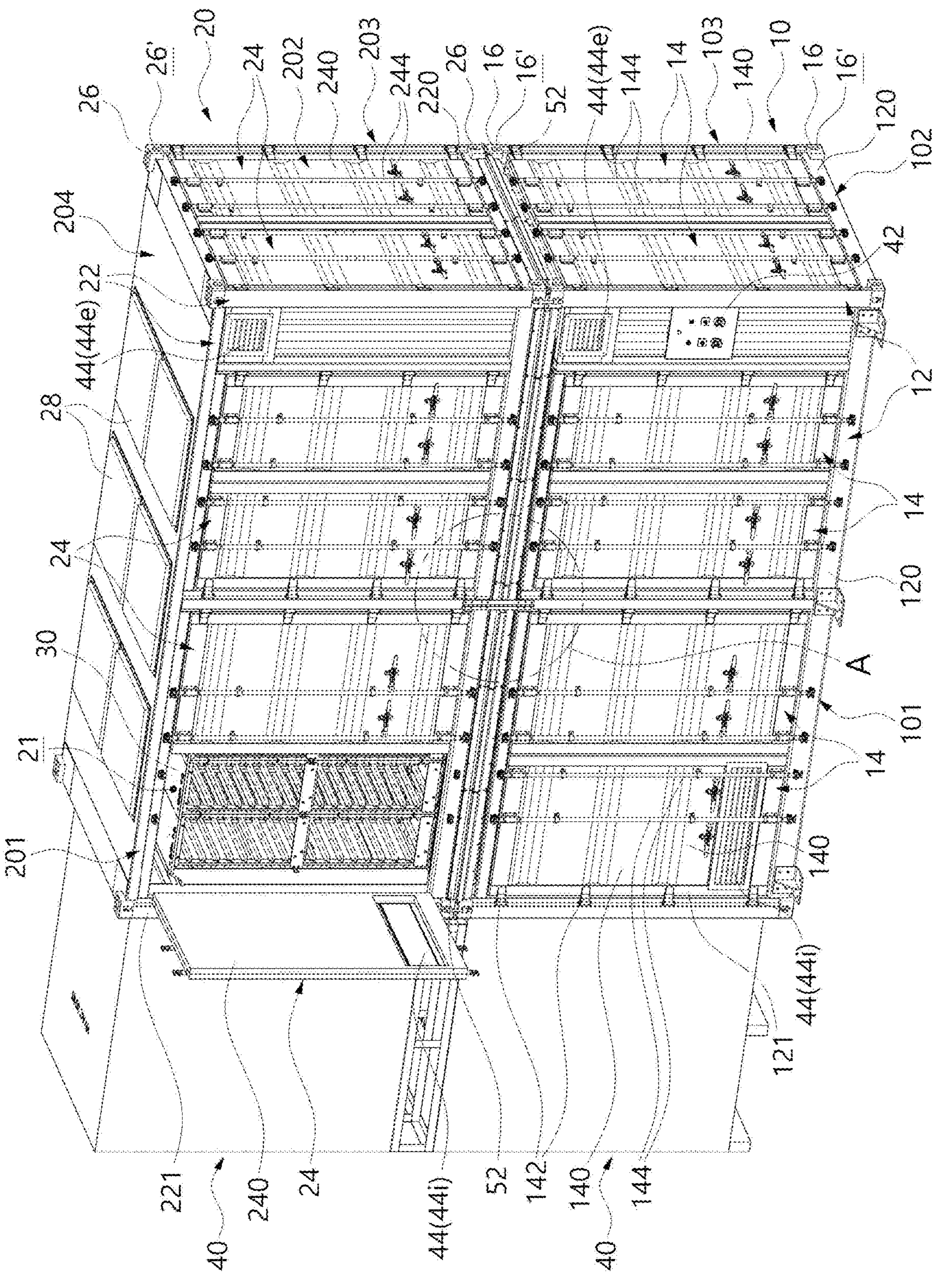
FIG. 2 is a perspective view showing a state in which one of the second door units is opened in the embodiment shown in FIG. 1.
Figure 3:
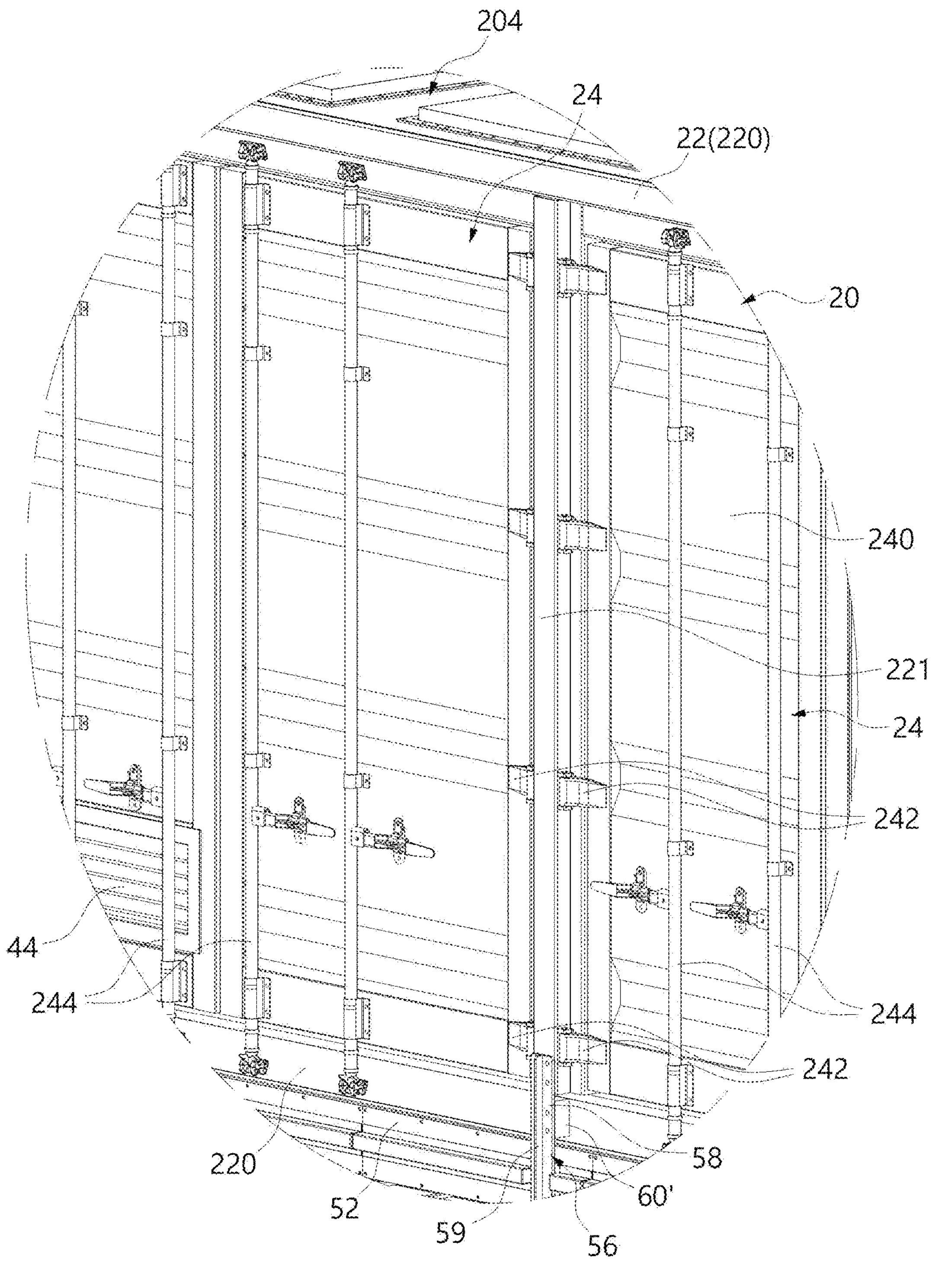
FIG. 3 is an enlarged view of part A of FIG. 1.

When maintenance work needs to be performed during operation, the door units 14 and 24 are opened as shown in FIG. 2 to access a place to be maintained. The door units 14 and 24 are formed in multiple numbers on the outer surfaces of the first housing 10 and the second housing 20, so that maintenance work may be performed by accessing the inner spaces 11 and 21 from any position. In the case of the second housing 20, an operator may not have direct access from the ground. In this case, a mobile platform having a lift or a fixedly installed steel working platform may be used.

Even though it has been described that all components constituting the embodiments of the present disclosure are combined into one or operated in combination with each other, the present disclosure is not necessarily limited to the embodiments. That is, within the scope of the objective of the present disclosure, all of the components may be selectively combined into at least one and operated. In addition, the terms such as "include", "consist of", or "have" described above mean that the corresponding component may be present unless otherwise stated, and thus should be construed that the terms do not exclude other components, but may further include other components. All terms, including technical or scientific terms, have the same meaning as commonly understood by those skilled in the art to which the present disclosure belongs, unless defined otherwise. Generally used terms, such as terms defined in the dictionary, should be interpreted as being consistent with the contextual meaning of the related art, and should not be interpreted in an ideal or excessively formal meaning unless explicitly defined in the present disclosure.

The above description is merely illustrative of the technical idea of the present disclosure, and those skilled in the art to which the present disclosure belongs may perform various modification and changes within the scope not departing from the essential characteristics of the present disclosure. Accordingly, the embodiments disclosed in the present disclosure are not intended to limit, but to explain the technical idea of the present disclosure, and the scope of the technical spirit of the present disclosure is not limited by these embodiments. The scope of protection of the present disclosure should be interpreted by the claims below, and all technical spirits within the scope equivalent to the scope of the claims should be interpreted as being included in the scope of the claims of the present disclosure.

In the illustrated embodiment, the energy storage system is disclosed in which the first housing 10 and the second housing 20 are stacked in two layers, but the housings may be stacked in multiple layers, such as three and four layers. That is, the third housing, the fourth housing, and the like may be used to form various layers.

The invention claimed is:

1. A housing stacking type energy storage system comprising:
- a first housing having a first inner space formed therein;
- a second housing seated and stacked on the first housing and having a second inner space formed therein;
- a plurality of battery packs mounted on racks installed in the first inner space and racks installed in the second inner space;
- a control unit for controlling charging and discharging of the plurality of battery packs;
- a first top plate provided along an upper surface edge of the first housing; and
- a sealing member provided on the first top plate and on which the second housing is seated,
- wherein a waterproof plate connecting between the first housing and the second housing seated on the sealing member is further provided to shield the sealing member.

2. The system of claim 1, wherein the first inner space and the second inner space communicate with each other, and the racks installed in the first inner space and the racks installed in the second inner space are disposed in a plurality of rows.

3. The system of claim 1, wherein the first housing includes a first housing frame that forms a skeleton of the first housing and a first door unit that allows access to the first inner space, wherein the second housing includes a second housing frame that forms a skeleton of the second housing and a second door unit that allows access to the second inner space.

4. The system of claim 3, wherein an anti-sag bracket is provided to connect a vertical member of the first housing frame and a vertical member of the second housing frame.

5. The system of claim 4, wherein the anti-sag bracket includes:

a protector body having a plurality of fastening holes formed at both ends thereof, a first spacer block provided on one surface of the protector body and in close contact with the first housing frame, and a second spacer block provided on one surface of the protector body and in close contact with the second housing frame.

6. The system of claim 5, wherein a reinforcing piece protruding and extending from opposite surfaces of the first and second spacer blocks in the longitudinal direction of the protector body is further provided.

7. The system of claim 1, wherein a first fastening part having a first fastening hole is provided at corners of the first housing, and a second fastening part having a second fastening hole is provided at corners of the second housing, so that the first housing and the second housing are fastened to each other.

8. The system of claim 1, wherein components constituting the control unit are installed inside the first housing and second housing, wherein a fire extinguishing system and a spray system are further provided inside the first housing and the second housing.

9. The system of claim 8, wherein the spray system is installed in the second inner space of the second housing.

10. The system of claim 1, further comprising a pressure discharge plate that is provided on an upper surface of the second housing, wherein the pressure discharge plate is torn open when a pressure of the first inner space or a pressure of the second inner space exceeds a predetermined level to discharge the pressure of the first inner space or the pressure of the second inner space to the outside.

11. The system of claim 1, further comprising a heat exchange unit that supplies a fluid at a predetermined temperature to the first housing and second housing, the heat exchange unit that performs heat exchange by receiving the fluid passing through the first inner space and the second inner space.

12. The system of claim 11, wherein a heat exchange unit connected to the first housing and a heat exchange unit connected to the second housing are provided, and the heat exchange unit connected to the first housing and the heat exchange unit connected to the second housing are installed by stacking.

13. The system of claim 11, wherein a flow forming plate and a partition plate are provided to form a flow path, so that a fluid at a predetermined temperature supplied from the heat exchange unit flows through a space between the racks installed in the first inner space and the racks installed in the second inner space and a space between the racks installed in the second inner space and a ceiling surface of the second housing.

14. The system of claim 13, wherein the racks installed in the first inner space and the second inner space are arranged in a plurality of rows, and the partition plate is installed in at least one of the racks to open and close a space between the plurality of rows of the racks.

15. The system of claim 14, wherein the partition plate includes a plate-shaped partition plate body, and a hinge that rotates the partition plate body with respect to the at least one of the racks when a pressure formed in the first inner space or a pressure formed in the second inner space exceeds a predetermined level.

16. The system of claim 1, wherein a waterproof fence is further provided along the front end of the first top plate to prevent moisture falling on the first top plate from being transferred to the first inner space.

17. A housing stacking type energy storage system comprising:

a first housing having a first inner space formed therein;

a second housing seated and stacked on the first housing and having a second inner space formed therein;

a plurality of battery packs mounted on racks installed in the first inner space and racks installed in the second inner space;

a control unit for controlling charging and discharging of the plurality of battery packs; and a heat exchange unit that supplies a fluid at a predetermined temperature to the first housing and second housing, the heat exchange unit that performs heat exchange by receiving the fluid passing through the first inner space and the second inner space;

wherein a flow forming plate and a partition plate are provided to form a flow path, so that a fluid at a predetermined temperature supplied from the heat exchange unit flows through a space between the racks installed in the first inner space and the racks installed in the second inner space and a space between the racks installed in the second inner space and a ceiling surface of the second housing.

18. The system of claim 17, wherein the racks installed in the first inner space and the second inner space are arranged in a plurality of rows, and the partition plate is installed in at least one of the racks to open and close a space between the plurality of rows of the racks.

19. The system of claim 18, wherein the partition plate includes a plate-shaped partition plate body, and a hinge that rotates the partition plate body with respect to the at least one of the racks when a pressure formed in the first or second inner space exceeds a predetermined level.

* * * * *